United States Patent
Emanuele et al.

[11] Patent Number: 5,362,083
[45] Date of Patent: Nov. 8, 1994

[54] APPARATUS FOR MOVING HEAVY EQUIPMENT

[75] Inventors: Michael B. Emanuele, Rootstown; Richard E. Gorby, Ravenna, both of Ohio

[73] Assignee: Chrysler Corporation, Highland Park, Mich.

[21] Appl. No.: 100,404
[22] Filed: Aug. 2, 1993
[51] Int. Cl.$^5$ .............................................. B60P 3/40
[52] U.S. Cl. ................... 280/404; 280/656; 280/789; 414/498
[58] Field of Search ........... 280/404, 400, 408, 411.1, 280/412, 785, 789, 793, 794, 656, 35, 42; 414/498

[56] References Cited

U.S. PATENT DOCUMENTS

| | | | |
|---|---|---|---|
| 348,005 | 8/1886 | Goodman | 280/81.1 |
| 1,637,129 | 7/1927 | Pritchett | 280/42 |
| 2,931,664 | 4/1960 | Morling | 280/656 |
| 3,147,715 | 9/1964 | Myers | 410/45 |
| 3,280,931 | 10/1966 | Cahill et al. | 180/23 |
| 3,442,409 | 5/1969 | Larson | 280/415.1 |
| 3,702,661 | 11/1972 | Berry, Jr. | |
| 3,719,299 | 3/1973 | Oehler | 280/404 |
| 4,200,305 | 4/1980 | Eubank | 280/404 |
| 4,375,892 | 3/1983 | Jenkins et al. | 280/43.23 |
| 4,665,834 | 5/1987 | van Iperen | 280/404 |

FOREIGN PATENT DOCUMENTS

| | | | |
|---|---|---|---|
| 1211524 | 3/1960 | France | 280/656 |
| 2560129 | 8/1985 | France | 280/404 |
| 432033 | 11/1970 | U.S.S.R. | |
| 1156939 | 5/1985 | U.S.S.R. | 280/404 |

Primary Examiner—Kenneth R. Rice
Assistant Examiner—Anne Marie Boehler
Attorney, Agent, or Firm—Edward A. Craig

[57] ABSTRACT

Apparatus for moving a stamping press or the like having a die opening, comprising a beam structure including a pair of elongated, laterally spaced, generally parallel beams. The beam structure is extended through the die opening with the ends of the beams projecting beyond the front and rear of the stamping press. Wheeled trucks disposed beneath the projecting ends of said beams support the beam structure at an elevation sufficient to raise the stamping press above the factory floor so that it may be moved to a new location.

2 Claims, 3 Drawing Sheets

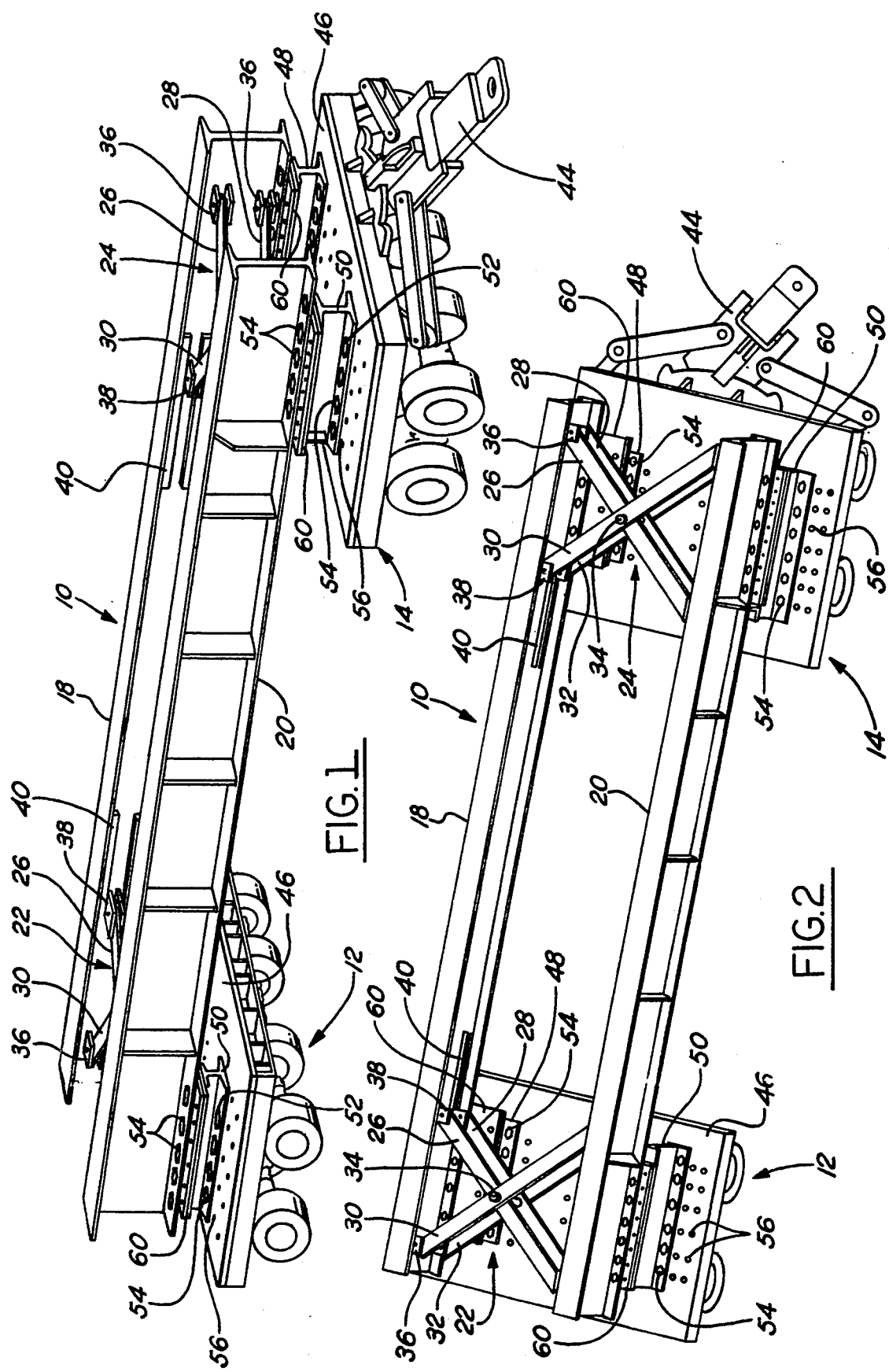

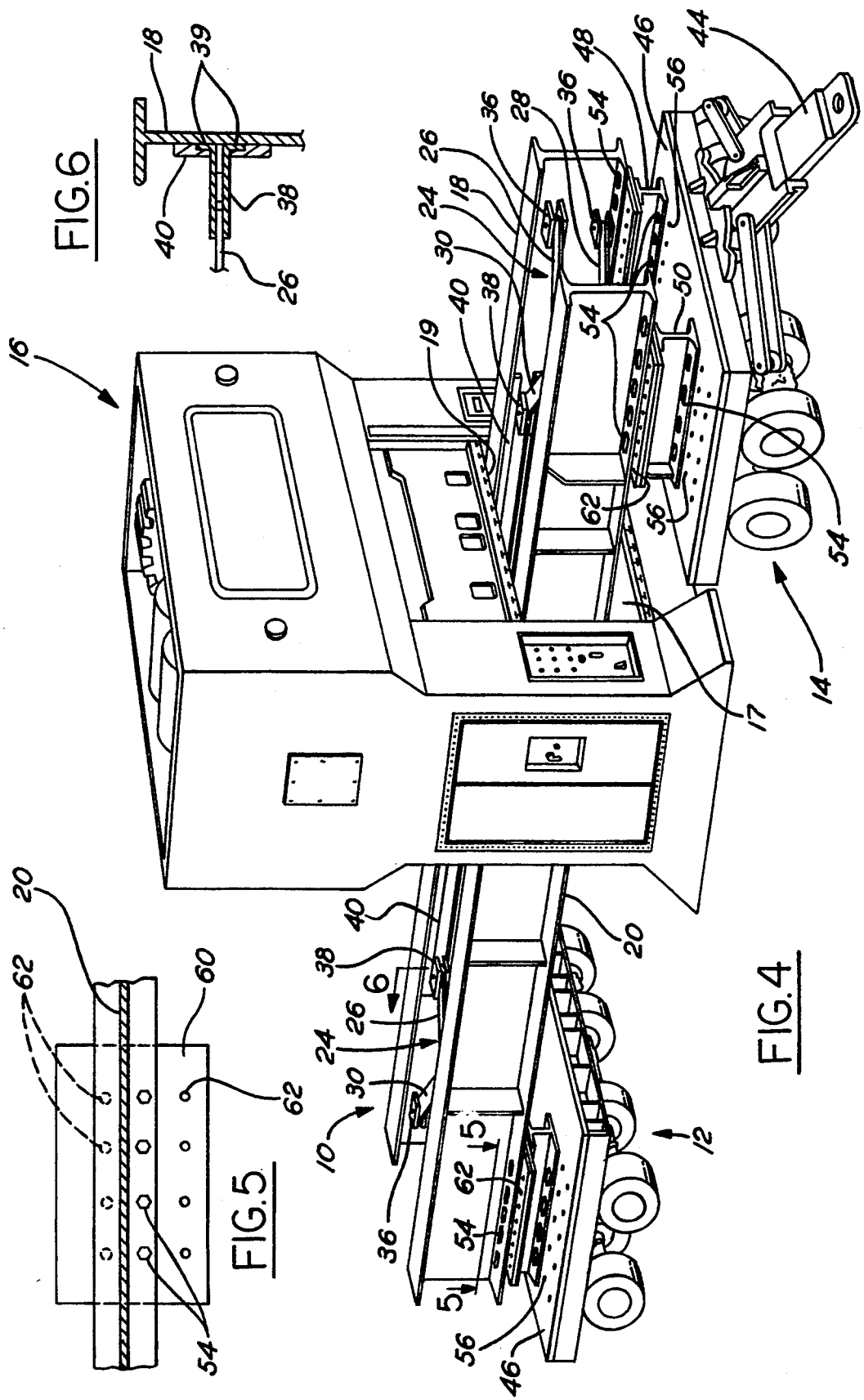

APPARATUS FOR MOVING HEAVY EQUIPMENT

BACKGROUND AND SUMMARY

This invention relates generally to apparatus for moving heavy objects and refers more particularly to apparatus for raising heavy machinery and moving it from place to place in a factory.

Occasionally it is necessary or desirable to move heavy machinery. At present, this is an extremely difficult and time consuming task due to the size and bulkiness of the object being moved.

In accordance with the present invention, the apparatus for moving heavy machinery comprises an elongated beam structure which is adapted to be extended under a downwardly facing surface of the machinery with its ends projecting beyond opposite sides thereof. Trucks are disposed beneath the ends of the beam structure and support the beam structure at an elevation sufficient to raise the machinery off the floor so that it can be moved.

More specifically, when the machinery to be moved is a stamping press or the like having a die opening, the beam structure is extended through the die opening and contacts the top of the die opening so that when the ends of the beam structure are supported on the trucks the beam structure is raised high enough to support the stamping press above the floor so that it can be moved.

Preferably the beam structure comprises a pair of elongated, laterally spaced, generally parallel beams, which are interconnected by adjustable linkage so that the spacing between the beams can be varied depending upon the width of the die opening. By spreading the beams apart to the maximum width of the die opening, greater stability is achieved. The linkages are preferably scissors jacks having crossing links which are pivoted together at the points of crossing.

Each truck preferably has means for mounting the beams in various different positions depending on their spacing.

It is an object of this invention to provide apparatus for moving heavy objects such as stamping presses and other machinery which has the foregoing features.

Another object is to provide apparatus for moving heavy objects which is composed of equipment some of which is generally available in a factory and which can be readily adapted for the purpose of this invention, which is rugged and durable in use, is composed of a relatively few simple parts and can be easily manufactured and assembled.

Other objects, features and advantages of the invention will become more apparent as the following description proceeds, especially when considered with the accompanying drawings.

BRIEF DESCRIPTION OF THE DRAWINGS

FIGS. 1 and 2 are perspective views of apparatus constructed in accordance with the invention including two trucks supporting the beam structure.

FIG. 4 is a perspective of the stamping press showing the beam structure extending through the die opening and the opposite ends of the beams supported on trucks at an elevation which raises the stamping press off the floor.

FIG. 5 is a fragmentary sectional view taken on the line 5—5 in FIG. 4.

FIG. 6 is a fragmentary sectional view taken on the line 6—6 in FIG. 4.

DETAILED DESCRIPTION

Figure 3:
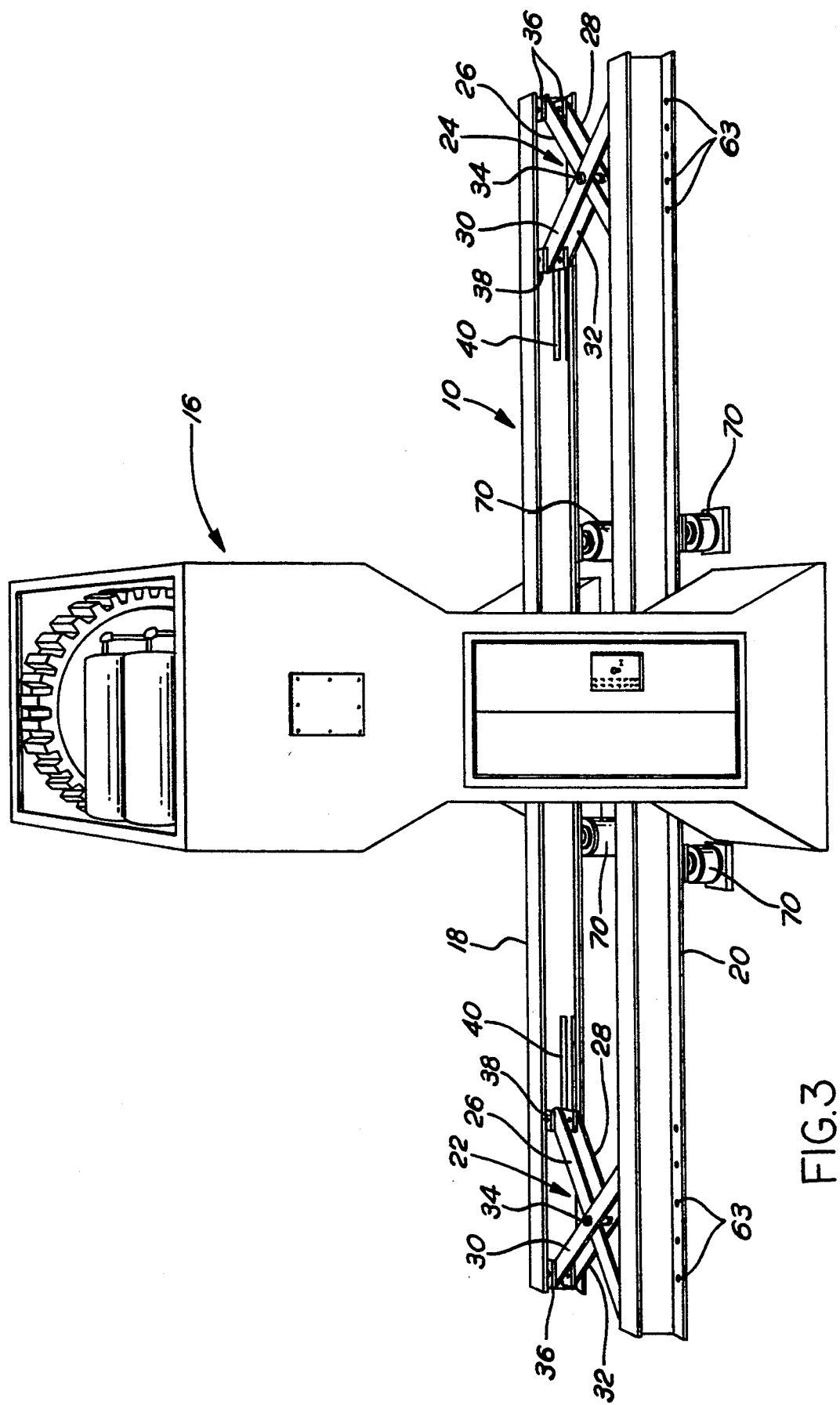
FIG. 3 is a perspective view as seen from the side, showing the beam structure extending through the die opening of a stamping press.

Referring now more particularly to the drawings, the apparatus of this invention is shown as including an elongated beam structure 10, and two wheeled trucks 12 and 14. This apparatus is intended for use in lifting heavy machinery such as a stamping press 16 off the floor so that it may be moved to another location. The stamping press has a generally rectangular die opening 17 which is open at the front and rear of the press and has a horizontal top wall 19.

The beam structure comprises a pair of upright, elongated I-beams 18 and 20 which are parallel to one another and are connected together by two linkages 22 and 24.

Each linkage comprises four links 26, 28, 30 and 32. Links 26 and 28 are disposed one above the other is parallel, horizontal relation, and extend at an acute angle to the length of the beam structure. Links 30 and 32 are disposed one above the other in parallel, horizontal relation, and extend at the opposite acute angle to the length of the beam structure so that links 26 and 28 respectively cross links 30 and 32 and are pivotally connected together at the crossing points by the connector 34. The ends of each link are pivoted to a fixed bracket 36 and a sliding bracket 38. The fixed brackets 36 are welded or otherwise fixedly secured to the webs of the respective beams. The sliding brackets 38 have flanged ends 39 which slide in guide rails 40 secured to the webs of the respective beams.

Linkages 22 and 24 may more properly be called support scissors and can be manually adjusted angularly with respect to one another by inserting pins in proper locating holes. The purpose of the linkages is to maintain the I-beams in a predetermined spaced, preferably parallel, relation to one another. Once adjusted, the linkages will maintain a fixed position and retain the beams at a predetermined adjusted spacing, until the linkages are adjusted again.

The two trucks 12 and 14 are substantially identical except that only truck 14 has the tow bar assembly 44 for towing purposes.

Each truck has a flat, horizontal top bed or supporting surface 46. A pair of upright parallel I-beams 48 and 50 are mounted on the supporting surface in laterally spaced, longitudinally extending positions. The bottom flanges of the I-beams 48 and 50 have longitudinally spaced holes 52 to receive fasteners 54 which extend into the registering holes 56 in supporting surface 46 for rigidly anchoring the I-beams. The holes 56 in the supporting surface are arranged in a plurality of parallel, laterally spaced, longitudinally extending rows so that the I-beams 48 and 50 may be anchored to the trucks in positions closer together or farther apart, as desired.

A flat, horizontal pallet 60 is rigidly secured to the top horizontal flange of each I-beam 48, 50. Each pallet has longitudinally spaced holes 62 to receive fasteners 54 which extend through registering holes 63 in the bottom flanges of the I-beams 18 and 20 to rigidly anchor the I-beams 18 and 20 to the pallets. The holes in each pallet are arranged in a plurality of parallel, laterally spaced, longitudinally extending rows so that the I-beams 18 and 20 may be anchored to the pallets in positions closer together or farther apart, as desired.

To raise the stamping press and move it to another location, the beam structure 10 is inserted through the die opening 17 of the press by any suitable means. For example, a fork lift truck may lift the beam structure and manipulate it into and through the die opening. The beam structure may be shifted and centered so that its opposite ends project equal distances beyond the front and rear of the press by operation of the fork lift truck alone or with the assistance of a second fork lift truck. Instead of or in association with the fork lift truck or trucks, an overhead crane may be employed to insert the beam structure through and center it with respect to the die opening.

For greater stability, the beam structure 10 is preferably adjusted so that the I-beams 18 and 20 are spread apart the full width of the die opening. This can be done either before or after the beam structure 10 is inserted in the die opening.

Fluid jacks 70, two for each I-beam 18 and 20, are placed beneath the beams adjacent to the press, are then activated to raise the beam structure into contact with the top wall 19 of the die opening. Further operation of the jacks will raise the beam structure and the press above the factory floor.

Next, the two trucks 12 and 14 are moved into positions under the projecting opposite end portions of the beam structure. The trucks are maneuvered so that the fastener holes in the I-beams 18 and 20 line up with the holes in the pallets. If the holes do not line up, the spacing between the I-beams may need adjustment, requiring that the trucks be temporarily removed from under the beam structure and the beam structure lowered by the jacks to rest the beam structure on the bottom of the die opening where the adjustment can be made. Adjustment may also be made, if necessary, in the mounting of the beams 48 and 50 on the trucks. The beam structure will again be raised to elevate the press and the trucks returned under the projecting opposite end portions of the beam structure in positions such that the fastener holes in the I-beams 18 and 20 and in the pallets line up. The jacks lower the beam structure until the beam structure comes to rest on the pallets, with the press still supported above the floor. The jacks are removed and the I-beams 18 and 20 are secured to the pallets by fasteners 54. The trucks then move the raised press to the desired new location, after which the fasteners securing the beams to the pallets are removed. The jacks may then be used to lift the beam structure and press off the trucks so that the trucks may be removed. The jacks lower the beam structure until the press comes to rest on the floor and the jacks are removed. The beam structure is removed from the press by means of the lift trucks and/or crane previously described.

The two beam-linkage construction of the beam structure 10 can be adjusted widthwise depending on the size of the die opening. The linkages provide stability, keeping the beams upright and parallel and maintaining them properly and rigidly spaced to match up the pattern of fastener holes in the beams and supporting pallets.

What is claimed is:

1. Apparatus for moving a stamping press having a die opening which has a generally horizontal, downwardly facing upper surface and which is open both at the front and the rear of the press, comprising a beam structure including a pair of elongated, horizontal, laterally spaced, generally parallel upright I-beams, each beam having horizontal top and bottom flanges and a vertical web between and connecting said flanges, each beam having first and second end portions, linkages at opposite end portions of said beams connecting said beams together, each linkage comprising a scissors support having crossing links pivotally connected together at the point of crossing, each link having first and second ends, and pivotal connections between said link ends and the webs of said respective beams, the pivotal connection between each beam and at least one link end of each scissors support being a sliding pivotal connection, whereby said linkages are adjustable to vary the spacing between said beams depending on the width of the die opening, means for adjusting said linkages to vary the spacing between the beams and then maintaining the adjustment until adjusted again, said beam structure being adapted to extend through the die opening with said end portions of said beams projecting beyond the front and rear of the stamping press, and first and second wheeled trucks movable over the floor and disposed beneath said projecting end portions of said beams, each truck having a horizontal top supporting surface, a pair of first beam supports on the top supporting surface of said first truck, a pair of second beam supports on the top supporting surface of said second truck, means for releasably securing the pair of beam supports on the top supporting surface of each truck in adjusted, laterally spaced apart relation to conform generally to the spacing of the beams, a first pallet rigidly mounted on each first beam support, a second pallet rigidly mounted on each second beam support, means for releasably securing the bottom flanges of said beams adjacent the first end portions of said beams to said respective first pallets in adjusted, laterally spaced apart relation, and means for releasably securing the bottom flanges of said beams adjacent the second end portions of said beams to said respective second pallets in adjusted, laterally spaced apart relation, said pallets supporting said beams at an elevation sufficient to engage the upper surface of the die opening and raise the stamping press above the floor.

2. Apparatus as defined in claim 1, and further including removable, floor-supported jacks for initially raising the beams sufficiently to engage the upper surface of the die opening and raise the stamping press above the pallets on said trucks and then to lower the beams onto said pallets in positions for releasably securing the bottom flanges of said beams to said pallets as aforesaid.

* * * * *